United States Patent
Baumgartner et al.

(10) Patent No.: US 9,403,171 B2
(45) Date of Patent: Aug. 2, 2016

(54) AIR QUALITY ENHANCEMENT SYSTEM

(71) Applicant: Baumgartner Environics, Inc., Olivia, MN (US)

(72) Inventors: John Baumgartner, Olivia, MN (US); Matthew Baumgartner, Olivia, MN (US)

(73) Assignee: Baumgartner Environics, inc., Olivia, MN (US)

( * ) Notice: Subject to any disclaimer, the term of this patent is extended or adjusted under 35 U.S.C. 154(b) by 102 days.

(21) Appl. No.: 14/176,350

(22) Filed: Feb. 10, 2014

(65) Prior Publication Data

US 2015/0224515 A1 Aug. 13, 2015

(51) Int. Cl.
 *B03C 3/41* (2006.01)
 *B01D 53/32* (2006.01)
 *B03C 3/86* (2006.01)

(52) U.S. Cl.
 CPC . *B03C 3/41* (2013.01); *B01D 53/32* (2013.01); *B03C 3/86* (2013.01); *B03C 2201/10* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 3,696,791 | A * | 10/1972 | Saurenman | A01K 45/00 119/437 |
| 3,973,927 | A * | 8/1976 | Furchner | A61N 1/10 422/22 |
| 4,282,830 | A | 8/1981 | Saurenman | |
| 4,388,667 | A * | 6/1983 | Saurenman | H05F 3/04 361/212 |
| 4,390,923 | A * | 6/1983 | Saurenman | H05F 3/04 361/212 |
| 4,484,249 | A * | 11/1984 | Saurenman | H05F 3/04 361/212 |
| 4,493,289 | A * | 1/1985 | Saurenman | A01K 45/00 119/437 |
| 4,502,091 | A * | 2/1985 | Saurenman | A01K 45/00 361/213 |
| 4,502,093 | A * | 2/1985 | Saurenman | A01K 45/00 361/215 |
| 4,626,917 | A * | 12/1986 | Saurenman | A01K 45/00 361/216 |
| 4,829,398 | A * | 5/1989 | Wilson | A61L 9/22 361/213 |
| 5,296,019 | A | 3/1994 | Oakley | |
| 5,323,508 | A | 6/1994 | Sheldrake | |

(Continued)

FOREIGN PATENT DOCUMENTS

WO WO 0006304 A1 * 2/2000 ............... B03C 3/09
WO 2011/006262 A1 1/2011

OTHER PUBLICATIONS

Mitchell, Bailey W., and John W. Baumgartner. "Electrostatic Space Charge System for Reducing Dust in Poultry Production Houses and the Hatchery."

(Continued)

*Primary Examiner* — Duane Smith
*Assistant Examiner* — Sonji Turner
(74) *Attorney, Agent, or Firm* — Michael A. Bondi; Moss & Barnett

(57) ABSTRACT

An air quality enhancement system that includes an enclosure and an electrostatic particle ionization system. A plurality of objects is located in the enclosure. The enclosure has an interior height that is greater than a height of the objects. The plurality of objects emits particles that become airborne. The electrostatic particle ionization system includes at least one corona point and a corona point mounting mechanism. The corona point mounting mechanism operably mounts the at least one corona point within the enclosure for movement between an extended position and a retracted. When in the extended position, the at least one corona point is closer to the plurality of objects than the enclosure. When in the retracted position, the at least one corona point is closer to the enclosure than the plurality of objects.

19 Claims, 3 Drawing Sheets

(56) References Cited

U.S. PATENT DOCUMENTS

| | | | | |
|---|---|---|---|---|
| 5,490,652 | A * | 2/1996 | Martin | A61B 6/4464 248/282.1 |
| 6,126,722 | A * | 10/2000 | Mitchell | B03C 3/09 361/226 |
| 6,431,515 | B1 * | 8/2002 | Gampe | F16M 11/04 172/4 |
| 6,464,754 | B1 * | 10/2002 | Ford | B03C 3/38 361/226 |
| 6,506,232 | B2 * | 1/2003 | Menear | B03C 3/78 95/59 |
| 6,620,224 | B1 | 9/2003 | Sato | |
| 6,872,238 | B1 | 3/2005 | Truce | |
| 7,746,621 | B2 * | 6/2010 | Jung | H01T 23/00 361/230 |
| 8,460,430 | B2 * | 6/2013 | Baumgartner | B03C 3/12 119/437 |
| 8,690,989 | B2 * | 4/2014 | Baumgartner | B03C 3/12 119/437 |
| 2002/0129704 | A1 * | 9/2002 | Menear | B03C 3/78 95/57 |
| 2004/0141874 | A1 | 7/2004 | Mullinax | |
| 2007/0165353 | A1 | 7/2007 | Fleischer | |
| 2007/0240572 | A1 | 10/2007 | Kiern et al. | |
| 2010/0269691 | A1 | 10/2010 | Baumgartner et al. | |
| 2011/0308384 | A1 * | 12/2011 | Baumgartner | B03C 3/12 95/6 |

OTHER PUBLICATIONS

Notification Concerning Transmittal of International Preliminary Report on Patentability (Chapter I of the Patent Cooperation Treaty), PCT/US2012/053674, dated Mar. 13, 2014.

International Search Report and Written Opinion (PCT/US2014/015616) dated May 16, 2014—9 pages.

* cited by examiner

AIR QUALITY ENHANCEMENT SYSTEM

REFERENCE TO RELATED APPLICATION

This application claims priority to U.S. Provisional Application No. 61/762,710, which was filed on Feb. 8, 2013, the contents of which are incorporated herein by reference.

FIELD OF THE INVENTION

The invention relates generally to a method of increasing air quality. More particularly, the invention relates to a system for increasing air quality utilizing electrostatic particle ionization.

BACKGROUND OF THE INVENTION

It has been found that animals that are maintained in a building where the air has high airborne particulate or aerosol concentrations are less productive. By less productive, it is meant that the animals gain weight at a rate that is slower than the rate at which animals that are maintained in a building that does not have a high airborne particulate or aerosol concentration.

Additionally, animals that are maintained in a building where the air has a high airborne particulate or aerosol concentration have a higher mortality rate than similar animals that are maintained in a building that does not have a high airborne particulate or aerosol concentration.

Airborne pathogens are a significant issue in commercial pig facilities. Most of these pathogens are attracted to an airborne particle or aerosol and travel through the air. Collectively these diseases cause tremendous reductions in productivity. When airborne particles or aerosols are removed from the air, many pathogens are removed from the air as well. Cleaner air results in fewer challenges to the animals' respiratory and immune response systems.

The porcine reproductive and respiratory system virus (PRRSv), for example, has an affinity for macrophages found in the lungs of pigs. In contrast to the typical functions of macrophages to ingest and remove invading bacteria and viruses, the porcine reproductive and respiratory syndrome virus multiplies within the macrophages until the concentration of the viruses is sufficiently large that the virus kills the macrophages.

The destruction of the macrophages in the animal leaves the animal vulnerable to attack by bacteria and other viruses, which can decrease the animal's growth rate and potentially lead to the death of the animal. The extent of such effects is impacted by the overall health of the animal and the other animals in the herd.

In addition to the preceding symptoms of porcine reproductive and respiratory syndrome, piglets that are born to sows that have this virus have decreased birth weight and are less viable than piglets born to sows that do not have this virus.

A common way for the porcine reproductive and respiratory syndrome virus to be transmitted is through the air. A technique that has previously been used to trap this virus is to pass air in the building in which the pigs are raised through a fine filter. There are challenges associated with using the filter systems to trap viruses.

The air circulation system needs to move a large volume of air to provide continuous fresh air for the animals. Dust and other air contaminants are trapped in these costly filter systems. There are significant expenses associated with the filters that are capable of trapping significant percentages of the viruses.

Poultry production includes two major categories—meat production and egg production. Currently, most poultry produced in North America is grown under close control on highly specialized farms. The evolution from small flocks to large commercial units after World War II was facilitated by advances in the knowledge of nutrition, breeding, housing, disease control, processing of poultry and eggs, and by improvements in transportation and refrigeration that made possible distant marketing of fresh products.

Poultry produced for meat production is commonly referred to as broilers. During the last few decades, broiler production has greatly increased as a result of Americans becoming more health conscious, as poultry is viewed by certain persons as healthier than other meats that are typically consumed by humans. The increased broiler production also resulted from the increased demand for export of poultry products to other countries.

The facilities that are typically used in conjunction with commercial poultry production each contain a relatively large number of birds. For example, each poultry production facility may house more than 20,000 birds.

The poultry production facilities confine the birds to protect them from predators and environmental extremes that would cause mortality or reduce growth, feed efficiency, immunocompetence, fertility or egg production. The poultry production facilities thereby facilitate efficiently managing a large volume of birds.

While the poultry production facilities enable a large volume of birds to be simultaneously raised, the large volume of birds generate waste materials that must be dealt with. One such waste material is airborne dust and biological particles.

Electrostatic precipitation of dust has been historically used to control emission from industrial smokestacks. This technique has also been used to remove dust from the air inside a living space.

When using electrostatic precipitation, ions are placed into the air space that is to be treated to polarize any particles in the air. Thereafter, the polarized particles are removed from the air by attraction to a grounded collection plate.

Over time, a progressively thick layer of particles collect on the collection plate. This progressively thicker layer of particles reduces the efficiency of the electrostatic precipitation system because the layer of particles insulates the collection plate from the polarized airborne particles. To enhance the efficiency of the electrostatic precipitation system, it is necessary to periodically clean the collection plates to dislodge the accumulated particles.

Disadvantages of these types of electrostatic precipitation systems are that only a limited airspace may be treated by one collection plate. The cost and size of multiple collection plate systems reduces the feasibility of using electrostatic particle ionization in very dusty and larger air spaces.

Mitchell et al., U.S. Pat. No. 6,126,722, uses corona points to discharge negative ions into a large air space that is being treated. This system relies on grounded surfaces inside and confining the air space to attract and hold the ionized particles.

While this system is effective at economically treating a large, dusty air space to reduce dust in the air, the polarized particles accumulate on the grounded surfaces and cause the grounded surfaces to become progressively more insulated. This process decreases the efficiency of this system.

Even though manual and/or mechanical cleaning will maintain the desired ionization level, the cost and limited ability to manually or mechanically clean grounded surfaces makes such a system a less than optimal result.

SUMMARY OF THE INVENTION

An embodiment of the invention is directed to an air quality enhancement system that includes an enclosure and an electrostatic particle ionization system. A plurality of objects is located in the enclosure. The enclosure has an interior height that is greater than a height of the objects. The plurality of objects emits particles that become airborne.

The electrostatic particle ionization system includes at least one corona point and a corona point mounting mechanism that operably mounts the at least one corona point within the enclosure for movement between an extended position and a retracted. When in the extended position, the at least one corona point is closer to the plurality of objects than the enclosure. When in the refracted position, the at least one corona point is closer to the enclosure than the plurality of objects.

Another embodiment of the invention is directed to a method of enhancing air quality. A plurality of objects is provided in an enclosure. The enclosure has a height that is greater than a height of the objects.

Particles are emitted from the objects. At least a portion of the emitted particles remain airborne in the enclosure. At least one corona point is mounted in the enclosure using a corona point mounting mechanism.

The at least one corona point is positioned in an extended position where the at least one corona point is closer to the plurality of objects than the enclosure. Electrical current is supplied to the at least one corona point to cause electrons to be discharged therefrom. The electrons associate with the airborne particles to form charged particles.

Charged particles accumulate on the plurality of objects. Electrical current is discontinued to the at least one corona point. The at least one corona point is moved to a retracted position where the at least one corona point is closer to the enclosure than the plurality of objects.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

An embodiment of the invention is directed to an electrostatic particle ionization system that causes electrons to be discharged from corona points. These electrons may react with whatever components are in the air proximate to where the electrons are being discharged.

The presence of a multitude of negative ions around the perimeter of a particle attracts all of the positive ions on a particle. When this process occurs, the particles become polarized. These polarized particles are attracted to each other and to grounded surfaces.

This process thereby removes the airborne particles from the air and prevents inhalation into the respiratory tract where infection can occur. When infection happens, diseases may be spread, health problems may be triggered and the immune systems of the persons, animals or birds who inhale these materials may be weakened. At the very least, food energy is diverted from growth to the immune system.

The air quality is enhanced because the electrostatic particle ionization system reduces levels of particles, dust, ammonia and hydrogen sulfide in the air. The negative ions may interfere with the cellular functions of microbes and inactivate them. This disruption may prevent the microbe from reproducing and thereby infecting the birds or the persons working in the poultry production facility.

For example, when the electrons encounter oxygen molecules in the air, the electrons react with oxygen and nitrogen molecules to cause the super anion ($0_2.^-$) to be formed, also known as super oxide. Super oxide is very reactive. As such, the super oxide readily reacts with other items in the air. Examples of such other items include particulates, pathogens and volatile organic compounds.

The super oxide may also inactivate bacteria. For example, when the electrostatic particle ionization system is used in a building in which turkeys are raised, the super oxide may kill *salmonella* that is present on the surface of the eggs.

The ions generated by the electrostatic particle ionization system may disrupt bacteria growth. By disrupting the bacterial growth, the bacteria are less likely to grow to a concentration such that the bacteria is ingested and/or inhaled by the animals. Such ingestion and inhalation could negatively impact the health of the animals.

As the animal health is negatively impacted, the rate at which the animal grows is reduced. The electrostatic particle ionization system thereby increases the productivity of the facility at which the animals are being raised by allowing more of the genetic potential of the animal to be realized.

A few factors by which the increase in the animal production productivity may be measured are the efficiency of feed conversion and the total body mass of the animals produced within a particular period of time. Even a relatively low increase of in the range of 3-4 percent can provide the financial justification to warrant installation of the system for enhancing air quality discussed herein.

The air quality enhancement system provides these results without the need for additional ventilation in the agricultural buildings. Not using this additional ventilation is desirable especially in regions where the ambient temperature is too low or too high for optimal growth of the animals because the air removed from the building with the ventilation system must be replaced with heated or cooled air, which can represent a significant additional cost in operating the agricultural facility.

Another benefit of the air quality enhancement system is the improved air quality for persons who are working in the agricultural buildings that heretofore have experienced high airborne particulate levels.

An embodiment of the invention is directed to an electrostatic particle ionization system as illustrated at 110 in FIG. 1.

The electrostatic particle ionization system 110 includes a corona point assembly 112 and a corona point mounting system 114.

Figure 2:
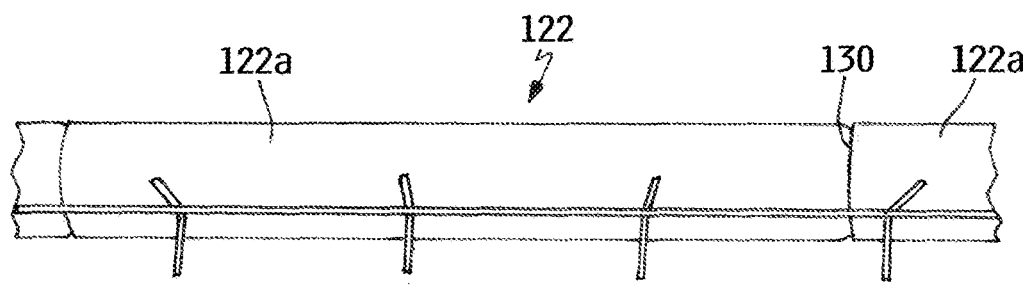
FIG. 2 is a bottom view of a corona point assembly for use in conjunction with the electrostatic particle ionization system of FIG. 1.
Figure 3:
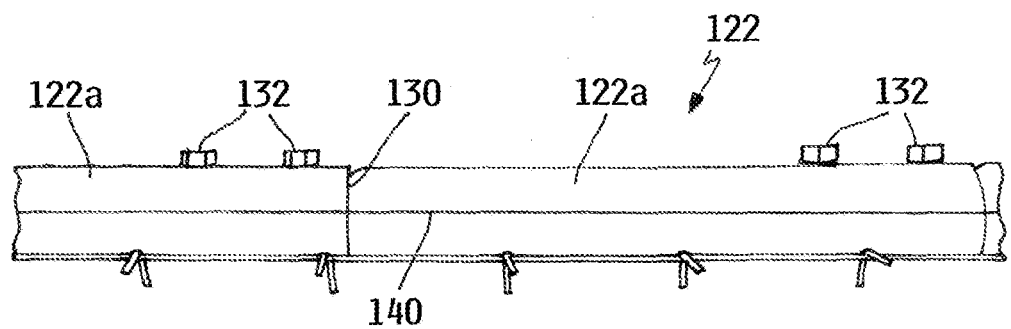
FIG. 3 is a side view of a corona point assembly of FIG. 2.

The corona point assembly 112 includes a plurality of corona points 120 that are mounted to a corona support 122 in a spaced-apart configuration, as illustrated in FIGS. 2 and 3. The corona points 120 are fabricated from a conductive material. An example of one such conductive material that may be used to fabricate the corona points 120 is a stainless steel rod. In certain embodiments, the stainless steel rod has a diameter of about 16 gauge.

Figure 4:
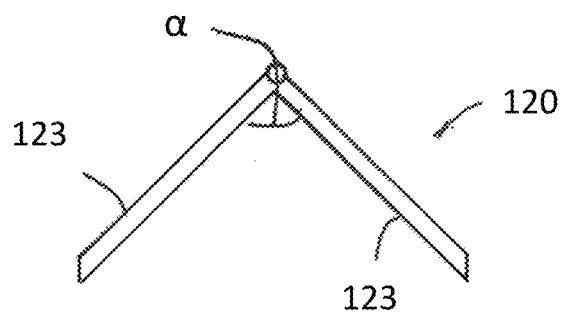
FIG. 4 is a side view of a corona point for use in conjunction with the corona point assembly of FIG. 2.

The corona points 120 may be formed in a V-shape that includes two legs 123, as illustrated in FIG. 4. An angle α between the legs may be between about 70 degrees and about 150 degrees. In other embodiments, the angle between the corona point legs 123 is between about 90 degrees and about 120 degrees.

A length of each leg 123 of the corona point 120 may be between about ½ of an inch and about 5 inches. In certain embodiments, the legs 123 have a length of about 1¼ inches. Both of the legs 123 on each of corona point 120 may have a length that is approximately equal.

Distal ends of each leg on the corona point 120 may be tapered to a point as illustrated in FIG. 4. In certain embodiments, the distal ends are oriented at an angle of greater than about 120 degrees. The angled orientation of the distal end of the corona point leg may play a role in the ionization performance of the electrostatic particle ionization system.

In certain embodiments, the corona points 120 are mounted at a spacing of between about 1 and 6 inches. In other embodiments, the corona points 120 are mounted at a spacing of approximately 2.275 inches. A spacing between the corona points 120 and the end of the spine may be about ½ of the distance between the corona points.

The corona support 122, illustrated in FIGS. 2 and 3, may be formed from a substantially rigid material. In certain embodiments, the corona support 122 is fabricated from a metallic material that exhibits a high level of conductivity. An example of one suitable metallic material that may be used for the corona support 122 is stainless steel.

In certain embodiments, the corona support 122 may be fabricated from a generally cylindrical tube. An advantage of using a generally cylindrical tube as opposed to other shapes is that the generally cylindrical tubes are commercially available in a variety of diameters. It is possible to utilize other configurations for the corona support 122. Non-limiting examples of such alternative configurations include square, rectangular, oval, I-shaped and L-shaped.

The greater the strength of the corona support, the fewer support cables that need to be used with the corona support 122. A person of skill in the art will appreciate that a variety of factors may affect the strength of the corona support 122. An example of two such factors is the diameter of the corona support 122 and the thickness of the wall of the corona support 122.

In certain embodiments, the corona support 122 has a diameter of between about ½ of an inch and about 3 inches. In other embodiments, the corona support has a diameter of between about ¾ of an inch and about 1 inch.

To facilitate adapting the electrostatic particle ionization system 110 for use in buildings having a variety of dimensions, the corona support 122 may be fabricated in a modular configuration. The modular configuration enables several of the sections to be attached together to form a corona support 122 having a desired length.

The corona point sections **122*a* may have a length that facilitates readily shipping of the corona point sections 122*a* without the need for special shipping vehicles. In certain embodiments, the corona point sections 122*a* may have a length of between about 5 feet and about 25 feet. In other embodiments, the corona point sections 122*a*** may have a length of about 8 feet.

To facilitate attachment of the corona point sections **122*a* to each other, one end of each corona point section 122*a* may have a reduced diameter portion 130 such that an outer diameter of the reduced diameter portion 130 is slightly smaller than an inner diameter of the other portions of the corona point section 122*a***.

The difference in such diameters should be sufficiently small such that the reduced diameter portion 130 may be readily inserted into a non-reduced diameter end on another corona pipe section **122*a*. However, the difference between such diameters should be sufficiently small to reduce the potential of the corona pipe sections 122*a*** disconnecting during the assembly process.

In addition to facilitating the assembly process, the reduced diameter portions 130 also enhance the ability to form the corona support 122 in a generally linear configuration. In certain embodiments, the reduced diameter region has a length of between about 1 inch and about 6 inches.

To reduce the potential of the corona pipe sections **122*a* disconnecting from each other during the use of the electrostatic particle ionization system 110, a fastening device 132 may be used to engage the adjacent corona pipe sections 122*a***.

An example of one suitable fastening device 132 is a screw. To avoid the need to predrill the corona pipe sections **122*a*, the screw may be a self-tapping screw. Depending on factors such as the diameter of the corona pipe sections 122*a*, more than one fastening device 132 may be used at each joint. In certain embodiments, there are two fastening devices 132 used at each joint between the corona pipe sections 122*a***.

Each of the corona pipe sections **122*a* may include an alignment guide 140 that facilitates accurate alignment of the corona points 120 on each of the corona pipe sections 122*a* so that after assembly, the corona points 120 are all directed in substantially the same direction. In certain embodiments, the alignment guide 140 is a line that is provided on a surface of each of the corona pipe sections 122*a***.

In other embodiments, the alignment guide 140 is a seam on the corona pipe section **122*a* that is a result of the process used to manufacture the corona pipe sections 122*a*. For example, when the corona pipe sections 122*a*** are fabricated from stainless steel, the stainless steel is initially in a flat configuration and is then bent into a cylindrical configuration and the opposite ends are joined together to form the generally cylindrical pipe.

A variety of techniques may be used to associate the corona points 120 with the corona support 122. Such techniques may be selected to minimize the potential of the corona points being damaged during manufacturing, distribution, installation and use of the electrostatic particle ionization system 110.

The techniques may also facilitate transfer of the electric current from the corona support 122 to the corona points 120. However, because of the high voltage of the electric current that is typically used with the electrostatic particle ionization system 110, the electric current may jump even small distances between the corona support 122 and the corona points 120.

An example of one suitable technique for associating the corona points 120 with the corona support 122 is welding. In certain embodiments, the corona points are placed in a jig or other support prior to welding. This jig may not only retain the corona points 120 in a desired position with respect to the corona support 122 but also in a desired orientation with respect to the corona support 122.

Figure 1:
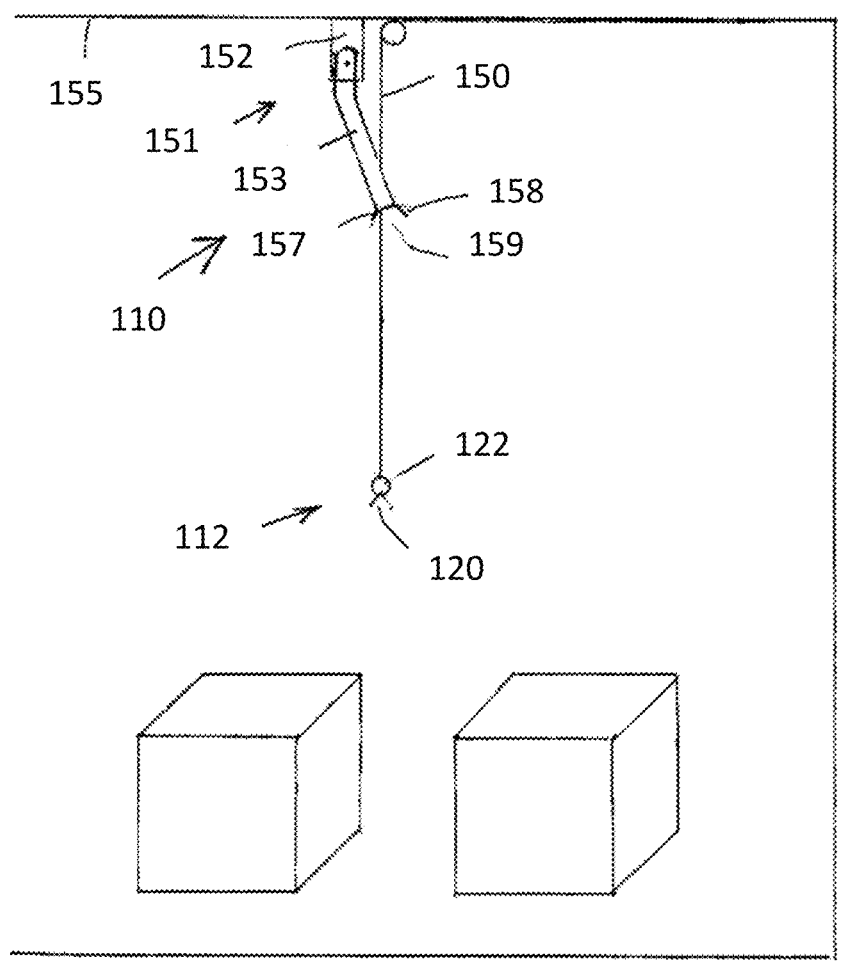
FIG. 1 is a side view of an electrostatic particle ionization system according to an embodiment of the invention.

The corona point mounting system 114, illustrated in FIG. 1, may function to move the corona point assembly 112 from a use location where the corona points 120 are located proximate the objects from which the particles or pathogens are emitted to a retracted position where the corona points 120 and the other components of the electrostatic particle ionization system 110 are at a height so that it is unlikely that such components will be damaged by contact with persons or equipment that are used proximate to where the electrostatic particle ionization system 110 is located.

In certain embodiments, the corona point mounting system 114 includes at least one support rope 150 that extends from a ceiling or other elevated portion of a building in which the electrostatic particle ionization system 110 is installed or a support structure if the electrostatic particle ionization system 110 is not used within a building.

Because the components of the corona point assembly 112 may be formed with a relatively light weight, the support rope 150 does not have to have a large strength. A person of skill in the art will appreciate that if the corona point assembly 112 has sufficient rigidity, it is possible to use fewer yet stronger support ropes 150. In such situations, the support ropes 150 may be formed from metallic or non-metallic materials.

Figure 5:
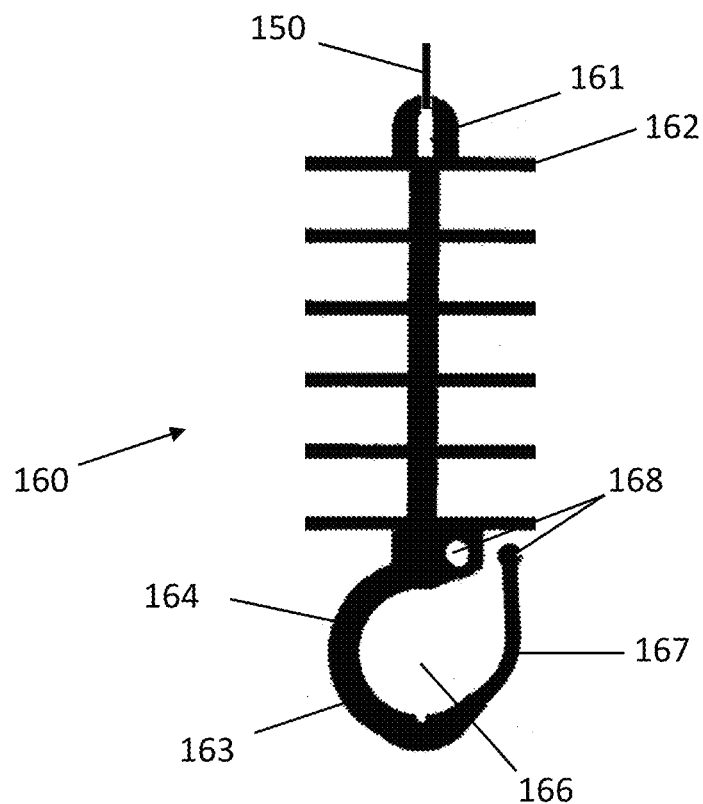
FIG. 5 is a side view of a mounting mechanism for use with the electrostatic particle ionization system of FIG. 1.

The support rope 150 may be attached to the corona insulator 160 using a mounting mechanism 161, as illustrated in FIG. 5. Such an insulator 160 may prevent electric current from passing from the corona support 122 to the support rope 150. The insulator 160 may be selected based upon factors such as the electric voltage that is used in conjunction with the electrostatic particle ionization system 110. In certain embodiments, the mounting mechanism 161 opening may resemble a hook rather than a closed loop.

The mounting mechanism 161 is attached to at least one insulator disk 162. In a certain embodiment six insulator disks 162 may be used. In certain embodiments, insulator discs are spaced one-half inch apart from each other, but may vary between one quarter inch and one and one half inches apart.

A corona support 122 may be attached to an insulator disc 162 using a mounting mechanism 163 which has a recess 164 that has an opening 166 with a width that is greater than the diameter of the corona support 122. In certain embodiments, the opening 166 may be at least partially upwardly directed.

Using such a configuration enables the corona support 122 to be readily attached to or detached from the mounting mechanism 163 without the use of tools while at the same time minimizing the potential of the corona support 122 inadvertently detaching from the mounting mechanism 163.

In certain embodiments the opening 166 may have a flexible closure arm 167. In certain embodiments the closure arm 167 will have a pin-and-pocket snap-in mechanism 168. This embodiment will prevent inadvertently detaching the corona support 122 from the mounting mechanism 163.

Depending on the height of the building in which the electrostatic particle ionization system 110 is installed, the corona point mounting system 114 may also include a pivoting mechanism 151, as illustrated in FIG. 5. The pivoting mechanism 151 causes the corona points 120 to rotate from a downwardly direct configuration when in use to an upward and/or sideward direction when retracted.

The pivoting mechanism 151 may include a first arm section 152 and a second arm section 153. In certain embodiments, the first arm section 152 and the second arm section 153 are pivotally mounted to each other. The second arm 153 is bent so that it extends outward from the vertical plane of pivot and is suspended over the vertical plane of the corona point assembly 112.

A length of the first arm section 152 may be less than a length of a second arm section 153. In certain embodiments, the first arm section 152 is at least 3 times as long as the second arm section 166.

The first arm section 153 may be attached to a ceiling 155 or other overhead structure in building in which the electrostatic particle ionization system 110 is installed. The first arm section 152 may extend generally downward from the ceiling 155.

The second arm section 153 is attached to an end of the first arm section 152 that is opposite the ceiling 155. The second arm section 153 is movable with respect to the first arm section 152. In certain embodiments, the second arm section 153 is pivotally mounted to the first arm section 152. The first arm section 152 and second arm section 153 pivot four inches from the ceiling 155 to which the first arm section 152 is attached. In some embodiments this pivot distance can be between three and twelve inches.

An end of the second arm section 153 that is opposite the first arm section 152 includes a receptacle 157 that is adapted to receive at least a portion of the corona point assembly 112 when the corona point assembly 112 is being moved to the retracted position.

The receptacle 157 may retain the corona point assembly 112 in a substantially stationary position with respect to the second arm section 153 such that as the second arm section 153 pivots with respect to the first arm section 152, the corona point assembly 112 also pivots.

In certain embodiments, the receptacle 157 has two arms 158 that are mounted in a spaced-apart configuration such that a recess 159 is defined therebetween. The recess 159 may have a size that is slightly bigger than the corona point assembly 112 such that the corona point assembly 112 is positionable between the arms 158 when in the retracted position.

The support rope 150 may extend through one of the components in the second arm section 153. Such a configuration of the support rope 150 causes the corona point assembly 112 to be drawn into the receptacle 157 as the support rope 150 is being retracted.

Once the corona point assembly 112 has been drawn into the receptacle 157, the continued retraction of the support rope 150 causes the second arm section 153 to pivot upwardly. When the distal end of the second arm section 153 is proximate the ceiling 155, the retraction of the support rope 150 is stopped.

The electrostatic particle ionization system 110 may include a switch (not shown) that is engaged when the distal end of the second arm section 153 is proximate the ceiling 155 to cause the retraction of the support rope 150 to stop.

The pivoting mechanism 151 reduces the potential of persons or equipment in the building where the electrostatic particle ionization system 110 will be injured or damaged because the corona points 120 can be relatively sharp. The pivoting mechanism 151 also minimize the potential of the corona point assembly 112 being damaged by persons or equipment in the building in which the electrostatic particle ionization system 110 is installed.

This configuration is particularly important when the building in which the electrostatic particle ionization system 110 is installed has a relatively low ceiling. Such low ceilings are relatively common in agricultural buildings where chickens, turkeys and pigs are raised to help manage airflow.

The pivoting mechanism 151 also facilitates positioning the corona point assembly 112 proximate to where the particles are being generated when the corona point assembly 112 is in the extended position.

The corona point assembly 112 may be connected to a power supply if the electricity provided to the facility in which the electrostatic particle ionization system 110 is installed does not have a desired characteristics such as voltage.

In certain embodiments, the electrostatic particle ionization system 110 is operated at a relatively high voltage. This voltage may be greater than about 10,000 volts. In certain embodiments, the voltage is between about 20,000 volts and about 30,000 volts.

Operating the electrostatic particle ionization system 110 at such a voltage may pose challenges in controlling the flow of electricity to the corona point assembly 112 because conventional switches are not suitable for use with such high voltages. The switches used to control delivery of the electricity to the corona point assembly 112 should be selected to reliably operate under such conditions.

While an electrical current may be used in conjunction with the concepts of the invention, the electrical current may be provided with a high voltage and a low amperage to minimize potential of health hazards associated with electrical shock. In certain embodiments, the amperage used in this system may be on the order of milliamps.

The amperage of an electrostatic particle ionization system inside a clean room air space may vary based upon a variety of factors. An example of such factors includes the length of a corona point run. These factors are typically known at the outset of the ionization period.

Because of the relatively low electric current draw by the electrostatic particle ionization system 110, it may be possible for a single power supply to be used in conjunction with a relatively long length of the corona point assembly 112.

In certain embodiments, the corona point assembly 112 may have a length of at least about 800 feet. In other embodiments, the corona point assembly 112 has a length of between about 1,500 feet and about 2,000 feet.

Depending on the shape and size of the location in which the electrostatic particle ionization system 110 is installed, it may be possible for a single power supply to be used in conjunction with multiple rooms in a building or even multiple buildings.

In such situations, it may be undesirable to turn off power to the entire electrostatic particle ionization system 110 when it is desired to enter one of the rooms in the building or one of the buildings in which the electrostatic particle ionization system 110 is installed. In such situations, it may be desirable to have a switch associated with each room or each building in which the electrostatic particle ionization system 110 is installed.

The electrostatic particle ionization system 110 may not include a ground plane as part of the system. Rather, at least one of the components in the building in which the electrostatic particle ionization system 110 is installed may function as a ground plane.

Examples of objects located within the building that may function as a ground plane include the floor of the building, animals located in the building and other structures located in the building such as containment dividers.

Using one of the objects located in the building as a ground plane minimizes issues relating to collection of particles on a ground plane as effecting the performance of the electrostatic particle ionization system such as the increased height of the particle layer on the ground plane decreasing the efficiency of the attraction to additional particles to the ground plane.

Another advantage of using objects such as the floor of the building and animals located in the building as a ground plane is that it can be difficult to remove accumulated particles on portions of the building such as the ceiling. Additionally, accumulation of particles on lights in the building may decrease the amount of light emitted from such lights and such decreased light intensity is typically undesirable.

Positioning the corona points 120 proximate to the animals from which the particles are generated as well as orienting the corona points 120 downwardly towards the animals minimizes the potential of particles accumulating on portions of the building such as the ceiling or lights mounted within the building.

Ambient humidity may affect the performance of the electrostatic particle ionization system 110. In such situations, it may be advantageous to measure the ambient humidity and then based upon the measured ambient humidity, change the operational parameters of the electrostatic particle ionization system 110 such as increasing or decreasing the voltage and/or increase or decreasing a distance between the corona points 120 and the objects from which the particles are emitted.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. An air quality enhancement system that comprises:
an enclosure in which a plurality of objects are located, wherein the enclosure has an interior height that is greater than a height of the objects, wherein the plurality of objects emit particles that become airborne;
an electrostatic particle ionization system comprising:
at least one corona point;
a corona point mounting mechanism that operably mounts the at least one corona point within the enclosure for movement between an extended position and a retracted position, when in the extended position, the at least one corona point is closer to the plurality of objects than the enclosure and when in the retracted position, the at least one corona point is closer to the enclosure than the plurality of objects, wherein the air quality enhancement system does not comprise a ground plane as a component thereof.

2. The air quality enhancement system of claim 1, wherein the objects are animals.

3. The air quality enhancement system of claim 1, and further comprising a corona support to which the at least one corona point is mounted, wherein the corona support comprises a plurality of support sections.

4. The air quality enhancement system of claim 3, wherein each support section comprises an alignment guide and wherein alignment guides on adjacent support sections are aligned with each other prior to attaching adjacent support sections to each other with an attachment mechanism.

5. The air quality enhancement system of claim 1, wherein the corona point mounting mechanism comprises:
   an elongated support mechanism having a first end and a second end, wherein the first end is operably attached to the enclosure and wherein the at least one corona point is attached to the second end; and
   an arm assembly comprising a first arm section and a second arm section that are operably mounted to each other, wherein the first arm section is attached to the enclosure and wherein the elongated support mechanism is operably attached to the second arm section.

6. The air quality enhancement system of claim 5, wherein the first arm section is fixedly attached to the enclosure and wherein the second arm section is pivotally mounted to the first arm section.

7. The air quality enhancement system of claim 5, wherein the second arm section is non-linear and wherein the second arm section has a length that is greater than a length of the first arm section.

8. The air quality enhancement system of claim 5, wherein an end of the second arm section that is opposite the first arm section has a receptacle that is adapted to receive at least a portion of the at least one corona point.

9. The air quality enhancement system of claim 1, wherein the corona support mechanism causes the at least one corona point to pivot when moving between the extended position and the retracted position.

10. The air quality enhancement system of claim 1, wherein the corona point mounting mechanism further comprising an insulator and an attachment mechanism that releasably engages the at least one corona point and wherein the attachment mechanism includes an upwardly directed opening.

11. A method of enhancing air quality comprising:
    providing a plurality of objects in an enclosure, wherein the enclosure has a height that is greater than a height of the objects;
    emitting particles from the objects, wherein at least a portion of the emitted particles remain airborne in the enclosure;
    providing an air quality enhancement system that comprises at least one corona point and a corona point mounting mechanism, wherein the air quality enhancement system does not comprise a ground plane as a component thereof
    mounting the at least one corona point in the enclosure using the corona point mounting mechanism;
    positioning the at least one corona point in an extended position where the at least one corona point is closer to the plurality of objects than the enclosure;
    supplying electrical current to the at least one corona point to cause electrons to be discharged therefrom, wherein the electrons associate with the airborne particles to form charged particles;
    accumulating charged particles on the plurality of objects;
    discontinuing electrical current to the at least one corona point; and
    moving the at least one corona point to a retracted position where the at least one corona point is closer to the enclosure than the plurality of objects.

12. The method of claim 11, wherein the objects are animals.

13. The method of claim 11, and further comprising mounting the at least one corona point to a corona support, wherein the corona support comprises a plurality of support sections, wherein each support section comprises an alignment guide and wherein alignment guides on adjacent support sections are aligned with each other prior to attaching adjacent support sections to each other with an attachment mechanism.

14. The method of claim 11, and further comprising:
    mounting the at least one corona point to the enclosure with an elongated support mechanism; and
    mounting an arm assembly to the enclosure, wherein the arm assembly comprises a first arm section and a second arm section that are pivotally attached to each other, wherein the first arm section is attached to the enclosure and wherein the elongated support mechanism is operably attached to the second arm section.

15. The method of claim 11, wherein the second arm section is non-linear and wherein the second arm section has a length that is greater than a length of the first arm section and wherein an end of the second arm section that is opposite the first arm section has a receptacle that is adapted to receive at least a portion of the at least one corona point.

16. The method of claim 11, and further comprising pivoting the at least one corona point when the at least one corona point moves between the extended position and the retracted position.

17. The method of claim 11, wherein accumulating particles on objects within the enclosure instead of a dedicated ground plane minimizes decrease in performance of the air quality enhancement system caused by progressive accumulation of objects on the dedicated ground plane.

18. The method of claim 11, orienting the at least one corona point towards the objects that emit the particles reduces the particles that accumulate on the enclosure.

19. A method of enhancing air quality comprising:
    providing a plurality of objects in an enclosure, wherein the enclosure has a height that is greater than a height of the objects;
    emitting particles from the objects, wherein at least a portion of the emitted particles remain airborne in the enclosure;
    mounting at least one corona point in the enclosure using a corona point mounting mechanism;
    positioning the at least one corona point in an extended position where the at least one corona point is closer to the plurality of objects than the enclosure;
    supplying electrical current to the at least one corona point to cause electrons to be discharged therefrom, wherein the electrons associate with the airborne particles to form charged particles;
    accumulating charged particles on the plurality of objects;
    discontinuing electrical current to the at least one corona point;
    moving the at least one corona point to a retracted position where the at least one corona point is closer to the enclosure than the plurality of objects;
    measuring ambient humidity proximate to the air quality enhancement system; and
    adjusting at least one of a voltage provided to the at least one corona point and a distance between the at least one corona point and the objects that emit the particles.

* * * * *